Oct. 19, 1926.

V. L. SMITHERS

CLOSURE FOR CONDUITS

Filed Jan. 12, 1924

1,603,991

Inventor
VERNON L. SMITHERS his Attorneys

Patented Oct. 19, 1926.

1,603,991

UNITED STATES PATENT OFFICE.

VERNON L. SMITHERS, OF LANCASTER, OHIO, ASSIGNOR TO THE LANCASTER TIRE AND RUBBER COMPANY, OF COLUMBUS, OHIO, A CORPORATION OF OHIO.

CLOSURE FOR CONDUITS.

Application filed January 12, 1924. Serial No. 685,799.

Conduits for leading electric conductors into houses, buildings and other structures frequently constitute the means for admitting noxious or explosive gases into such structures. The primary object of the present invention is to provide means whereby the conduit may be plugged and such gases excluded from passing into the dwelling or building although the invention is useful at any point or points in a conduit where it is desirable to arrest or prevent the flow of any fluid from one part of a conduit to another part or place.

The invention is embodied in the example herein shown and described the features of novelty being finally claimed.

In the accompanying drawing—

Figure 1:
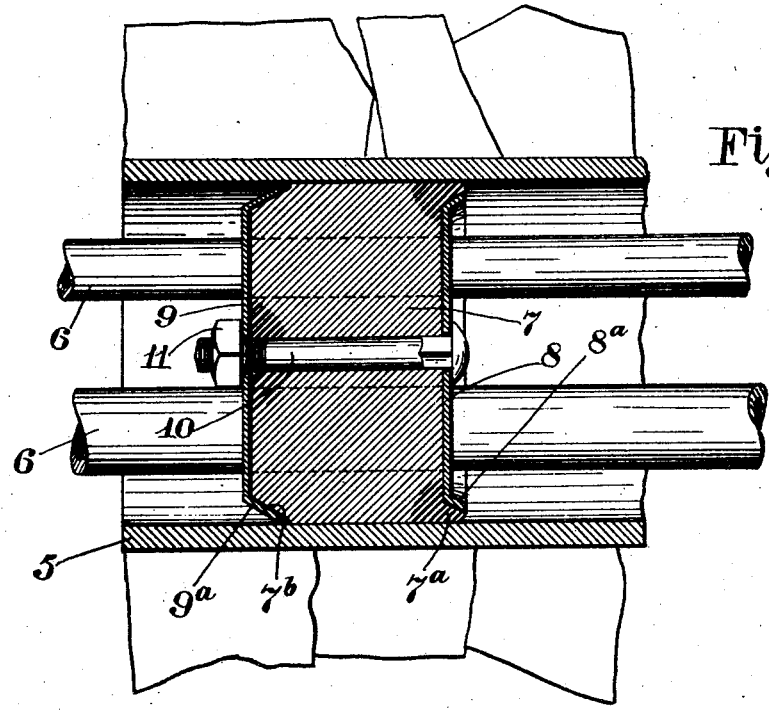
Figure 1 is a sectional view taken longitudinally of a fraction of a conduit showing my invention installed therein.
Figure 2:
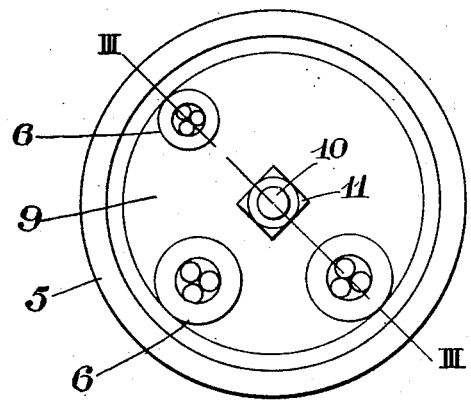
Fig. 2 is a view looking at the left hand end of the conduit and its contents as shown in Fig. 1.
Figure 3:
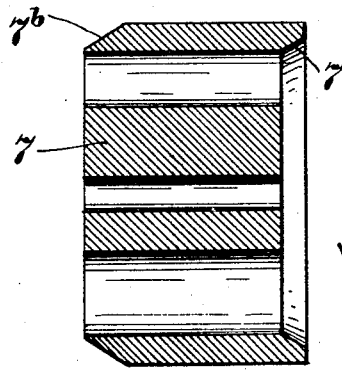
Fig. 3 is a section of the septum or plugging member before application to the conduit, on the line III—III Fig. 2.

In the views 5 designates the fraction of the conduit which is of usual material and which is shown herein as it terminates at the inner side of a cellar wall. 6 designates the usual cables for carrying the electric conductors. 7 designates a septum or plug of a suitable compressible or resistant material such for example as rubber or a compound thereof adapted to serve as a packing to resist the passage of a fluid. This septum is shown as normally formed or molded with an annular lip 7ª on one side and an annular bevel 7ᵇ on the other.

8 designates the right hand or innermost compression member and 9 the left or outer compression member. The inner compression member 8 is made with an outwardly flaring rim 8ª adapting that compression member to fit in the cavity of the right hand side of the septum in such a way that when pressure is applied the tendency will be to spread or expand and condense the material of the lip 7ª toward the wall of the conduit and thereby seal any space between the conduit and the rim of the septum, and the outer compressing member is made with an inwardly flaring flange 9ᵇ adapted when pressed toward the septum to exert a condensing effect at the contiguous face of the septum.

The septum and both compression members are provided with coinciding perforations for passage of as many cables as may be necessary, three in the present instance.

The septum and both compression members are also provided with central coinciding openings for the passage of a threaded bolt 10 having a head on one end, the threaded end adapted to receive a nut 11 for drawing the compression members toward each other and against the opposite sides of the septum or plug.

When the compression members are drawing toward each other and against the opposite sides of the septum as just stated the tendency of the compression member 9 is to compress or condense the material of the septum at that side and around the cables and the bolt connecting the compression members thus precluding the passage or leakage of fluids past said parts. I have conventionally illustrated to some extent the effects of the two compression members upon the septum by thickening the section lines of the septum at points where compression takes place such compression taking place, of course, all around the conduit as well as around the cables and bolt.

My invention obviously can be economically applied, and it affords an effective preventive of the passage of dangerous gases in an appreciable quantity through or from the conduit or such as might endanger the health and lives of the occupants of a building.

The forms of the parts can be changed without departing from the gist of the invention as claimed.

What I claim is:

1. Means for plugging conduits for electrical conductors comprising, in combination, a septum of elastic material having an eccentrically located perforation for the passage of the electrical conductors, said septum also having the corner at the rim of one of its faces annularly beveled and the corner of its rim at its opposite face provided with an annular lip, compression members for said faces each having a marginal flare to bear respectively upon said beveled corner and the lip, and central means connecting said compression members for drawing and holding them toward each other whereby said elastic septum is compressed substantially radially inward at the first named face and outwardly at the lip.

2. Means for plugging conduits for electrical conductors comprising, in combination, a septum of elastic material provided with an eccentrically located perforation for the passage of the electrical conductors, said septum having the outer corner of one of its faces beveled and its other face recessed to form an annular lip at the outer corner of said other face, a compression member for the first named face flared at its margin to fit the beveled corner, a compression member for the second named face having its margin flared to fit the annular lip and means engaging said compression members for drawing and holding them together to expand said annular lip into pressing contact with the conduit and the body of the septum into pressing contact with the eccentrically located conductor as well as with the means for drawing and holding said compression members together.

VERNON L. SMITHERS.